US012687051B2

(12) United States Patent (10) Patent No.: US 12,687,051 B2
Schmitz et al. (45) Date of Patent: Jul. 21, 2026

(54) DOOR LOCK, IN PARTICULAR MOTOR VEHICLE DOOR LOCK

(71) Applicant: KIEKERT AG, Heiligenhaus (DE)

(72) Inventors: Andreas Schmitz, Velbert (DE); Peter Szegeny, Engelskirchen (DE); Ömer Inan, Dorsten (DE)

(73) Assignee: KIEKERT AG, Heiligenhaus (DE)

( * ) Notice: Subject to any disclaimer, the term of this patent is extended or adjusted under 35 U.S.C. 154(b) by 440 days.

(21) Appl. No.: 18/565,616

(22) PCT Filed: Jun. 23, 2022

(86) PCT No.: PCT/DE2022/100465
§ 371 (c)(1),
(2) Date: Nov. 30, 2023

(87) PCT Pub. No.: WO2023/280346
PCT Pub. Date: Jan. 12, 2023

(65) Prior Publication Data
US 2024/0271471 A1 Aug. 15, 2024

(30) Foreign Application Priority Data

Jul. 5, 2021 (DE) ..................... 10 2021 117 217.9

(51) Int. Cl.
*E05B 81/86* (2014.01)
*B60R 16/023* (2006.01)
(Continued)

(52) U.S. Cl.
CPC ............ *E05B 81/86* (2013.01); *B60R 16/023* (2013.01); *B60R 16/03* (2013.01); *E05B 81/04* (2013.01);
(Continued)

(58) Field of Classification Search
CPC .......... E05B 81/86; E05B 81/04; E05B 81/14; H02J 7/933; H02J 2207/50; B60R 16/023; B60R 16/03
See application file for complete search history.

(56) References Cited

U.S. PATENT DOCUMENTS 4,203,039 A * 5/1980 Pritchard ................ E05B 77/48
361/160
6,914,346 B2 7/2005 Girard
(Continued)

FOREIGN PATENT DOCUMENTS

CN 105346508 A * 2/2016 ............ B60R 25/31
CN 118728191 A * 10/2024 ............ E05B 81/56
(Continued)

OTHER PUBLICATIONS

International Search Report mailed Sep. 13, 2022, for priority International Application No. PCT/DE2022/100465.

*Primary Examiner* — Chico A Foxx
(74) *Attorney, Agent, or Firm* — Renner, Otto, Boisselle & Skylar, LLP

(57) ABSTRACT

A door lock, in particular a motor vehicle door lock, which is equipped with a locking mechanism substantially comprising a rotary latch and a pawl. The door lock further comprises an electromotive opening drive for the locking mechanism and at least one emergency power source for supplying current to the opening drive during the emergency opening of the locking mechanism. The emergency power source is charged in accordance with a control unit-using a main energy source. According to the invention, the emergency power source is charged as soon as the control unit receives an unlocking signal for the locking mechanism.

16 Claims, 2 Drawing Sheets

(51) Int. Cl.

| | | |
|---|---|---|
| *B60R 16/03* | (2006.01) | |
| *E05B 81/04* | (2014.01) | |
| *E05B 81/76* | (2014.01) | |
| *H02J 7/90* | (2026.01) | |
| *E05B 81/14* | (2014.01) | |

(52) U.S. Cl.
CPC .............. *E05B 81/77* (2013.01); *H02J 7/933* (2026.01); *E05B 81/14* (2013.01); *H02J 2207/50* (2020.01)

(56) References Cited

U.S. PATENT DOCUMENTS

| | | | | |
|---|---|---|---|---|
| 10,138,656 | B2 | 11/2018 | Dente | |
| 10,480,222 | B2 * | 11/2019 | Funahashi ............... | E05B 81/56 |
| 11,542,731 | B2 * | 1/2023 | Leonardi ................ | G07C 5/008 |
| 2016/0340940 | A1 * | 11/2016 | Krishnan ........... | G07C 9/00309 |
| 2020/0055472 | A1 | 2/2020 | Kageyama et al. | |

FOREIGN PATENT DOCUMENTS

| | | | | | |
|---|---|---|---|---|---|
| DE | 102014105874 | A1 | 10/2015 | | |
| DE | 202016102459 | U1 * | 7/2016 | ............ | E05B 81/86 |
| DE | 202016105621 | U1 | 11/2016 | | |
| DE | 202016106542 | U1 | 4/2017 | | |
| DE | 102011115039 | B4 * | 7/2022 | ......... | H01R 13/6397 |
| EP | 2659075 | B1 | 11/2013 | | |
| FR | 2818682 | A1 | 6/2002 | | |
| KR | 100820469 | B1 * | 4/2008 | ............ | E05B 81/64 |
| WO | 2018139213 | A1 | 8/2018 | | |

* cited by examiner

DOOR LOCK, IN PARTICULAR MOTOR VEHICLE DOOR LOCK

This application is a national phase of International Patent Application No. PCT/DE2022/100465 filed Jun. 23, 2022, which claims priority to German Patent Application No. 10 2021 117 217.9 filed Jul. 5, 2021, each of which is hereby incorporated herein by reference in its entirety.

FIELD OF DISCLOSURE

The invention relates to a door lock, in particular a motor vehicle door lock, having a locking mechanism substantially comprising a rotary latch and a pawl, further having an electromotive opening drive for the locking mechanism and at least one emergency power source for supplying current to the opening drive during the emergency opening of the locking mechanism, the emergency power source being charged in accordance with a control unit using a main energy source.

BACKGROUND OF DISCLOSURE

For reasons of convenience, so-called electric locks are used nowadays and increasingly in motor vehicle door locks. They include the electromotive opening drive, which ensures that the locking mechanism is opened. In this context, a corresponding opening signal for the electromotive opening drive can typically be generated via a sensor or switch which, for this purpose, may be mounted, for example, in or on an outside door handle. Of course, a grip-free operation of such a sensor is also possible. The corresponding motor vehicle door lock can also be opened wirelessly. Such keyless vehicle systems including emergency power sources are described, for example, in DE 20 2016 105 621 U1.

In the generic prior art according to U.S. Pat. No. 10,138,656 B2, the procedure is such that the control unit monitors the charge state of the emergency power source and ensures charging of the emergency power source using the electrical power provided by the main energy source. In this context, correct operation overall is in the foreground, even in the event of an accident.

In an electronic lock with power failure control circuit according to EP 2 659 075 B1, a supercapacitor charger connected to a microcontroller is realized. The microcontroller ensures during a normal power state that the supercapacitor charger is turned on when a charge level of at least one supercapacitor is below a desired level. However, when the charge level of the supercapacitor concerned has reached a desired level, the supercapacitor is turned off.

An automobile vehicle door locking assembly is described as part of U.S. Pat. No. 6,914,346 B2, in which the back-up power source is designed as a supercapacitor and is mounted on an electronic board. As a result, the back-up power source can be incorporated in an associated lock housing.

Finally, utility model 20 2016 106 542 U1 deals with a supercapacitor charging system. For this purpose, the charging system is equipped with an energy management controller, with the aid of which charging and discharging of at least one supercapacitor is carried out. In addition, the energy management controller is able to detect and determine a charge amount. Depending on this, charging is continued or stopped.

Prior art has basically proven to be successful when it comes to, very generally, including an emergency power source in the function of the door lock and, with its help, controlling vehicle states in which the main energy source as a result of, for example, too low a voltage or due to an accident is not (no longer) able to supply the electromotive opening drive with the required electrical energy so that said opening drive can open the locking mechanism as desired. In this context, in addition to conventional rechargeable batteries, so-called supercaps or supercapacitors are increasingly used as an emergency power source. They are typically electrochemical capacitors, the advantage of which is that compared to batteries of the same weight, they have only about 10% of their energy density, but their power density is about 10 to 100 times as large. This is why supercapacitors can be charged and discharged much faster compared to rechargeable batteries. In addition, they have a long service life because they are suitable for significantly more switching cycles than rechargeable batteries of equal power.

Accordingly, supercapacitors can be as an emergency power source, for example, in circuit boards and inside a lock housing. However, supercapacitors like any energy source or emergency power source have the problem that the electrical power provided by them has fallen due to self-discharging after, for example, a longer idle time of an associated motor vehicle to such an extent that the electromotive opening drive is no longer able to emergency open the locking mechanism. A similar problem arises when the electrical connection between the emergency power source and the main energy source is broken or interrupted as a result of an accident or crash, for example. The emergency power source is normally charged once the motor vehicle is started. This is because sufficient electrical energy is then available via the generator or, for example, recuperator in order to complete the charging process in question.

However, in the event of an accident or other interruption of the connection between the main energy source and the emergency power source immediately after the start of the trip, there is a risk that the emergency power source does not have sufficient stored energy at the time in order to be able to open the locking mechanism during a subsequent emergency opening. In this case, the electromotive opening drive typically ensures that a pawl is lifted from its engagement with the rotary latch, so that subsequently the rotary latch opens, for example, in a spring-assisted manner or as a result of weatherstrip forces and releases a previously caught locking pin.

Only then can the associated motor vehicle door be opened. The invention as a whole seeks to remedy this.

SUMMARY OF DISCLOSURE

The invention is based on the technical problem of further developing such a door lock, and in particular a motor vehicle door lock, in such a way that emergency opening is possible even immediately after the start of the trip.

To solve this technical problem, a generic door lock, and in particular a motor vehicle door lock, as part of the invention is characterized in that the emergency power source is charged as soon as the control unit receives an unlocking signal for the locking mechanism.

The invention first of all proceeds from the finding that the unlocking signal for the locking mechanism always precedes, or must always precede, the starting of a respective motor vehicle with a starting device for example, provided that a motor vehicle door and thus the respective motor vehicle door lock is in a closed state. In general, with the unlocking in question and the associated unlocking signal for the locking mechanism, for example an actuating lever chain from the outside door handle to the locking mechanism is closed in case of a mechanically operating motor vehicle door lock, so that, subsequently, manual operation of the outside door handle can be used to lift the pawl from its latching engagement with the rotary latch.

Within the scope of the present invention, a mechanical actuating lever chain is generally not realized. Accordingly, the unlocking of the motor vehicle door lock following the receipt of the unlocking signal corresponds to that a sensor or switch associated with, for example, the outside door handle is controlled or effectively set and can detect actuations of the outside door handle. Consequently, if the outside door handle and thus the sensor or switch are subsequently operated, the corresponding sequence signal is interpreted as an opening signal, so that the electromotive opening drive is then supplied with current for normal opening of the locking mechanism.

Only now can the motor vehicle door be opened to give a user, who wishes to enter the vehicle, access to the interior space. The user must then normally operate the starting device for the motor vehicle to start driving and for the prior art main energy source to be able to charge the emergency power source. According to the invention, however, this charging process takes place much earlier, is namely initiated by the unlocking signal for the locking mechanism. Since the control unit specifies, monitors and controls charging of the emergency power source by the main energy source, according to the invention the receipt of the unlocking signal by the control unit directly ensures charging of the emergency power source. As already described, all of this happens before the starting device (the ignition lock) is operated or acted on. As a result, the emergency power source can generally be charged so much in the time period between receipt of the unlocking signal and starting by means of the starting device that subsequently at least one-time opening by means of the electromotive opening drive succeeds. I.e., the mentioned time period is usually sufficient for the emergency power source to reach a minimum charge state which corresponds to at least the previously described one-time opening process being able to be completed by the electromotive opening drive.

Therefore, the invention can ensure, for the first time, an emergency opening of the associated motor vehicle door lock even if the associated motor vehicle should have an accident as soon as it starts to drive or after it has started to drive. I.e., an accident happening directly after the start of the trip can be controlled in this way, because the emergency power source will be able even in that case, due to the fact that the minimum charge state has been reached, to control the electromotive opening drive during emergency opening such that the locking mechanism is reliably opened. As a result, possible mechanical redundancies are ultimately also unnecessary, which has particular design and cost advantages.

According to an advantageous embodiment, the unlocking signal is transmitted to the control unit in a wireless and/or wired manner. In case of a wireless unlocking signal, one could, for example, realize a keyless entry, as described by way of example in DE 20 2016 105 621 U1, to which reference has already been made hereinabove. In contrast, in case of a wired transmission of the unlocking signal to the control unit, the procedure is usually such that authorization of the operator wishing to enter the vehicle is queried and verified via an inserted key or an operated sensor, so that subsequently the unlocking signal is generated and transmitted to the control unit in a wired manner, so that the latter will and can ensure directly and subsequently that the emergency power source is charged using the main energy source.

For this purpose, the procedure is usually such that the control unit bridges the previously discussed starting device after receiving the unlocking signal and connects the main energy source directly with the emergency power source. I.e., unlike in prior art, at the beginning the electrical power supply of the emergency power source by the main energy source does not take place via the starting device and is also not dependent on the latter. Rather, after receiving the unlocking signal, the control unit ensures that the main energy source is connected directly to the emergency power source for charging the latter. It does not matter that the starting device has not yet been operated or operated at that time.

According to a further advantageous embodiment, the procedure is such that an increased initial current intensity at the beginning of the charging process is supplied to the emergency power source. This increased initial current intensity is maintained mainly until the minimum charge state has been reached. As already explained above, the minimum charge state of the emergency power source corresponds to the fact that, using the minimum charge state, the opening drive can be operated at least once in order to be able to open the locking mechanism.

After reaching the minimum charge state, the emergency power source is generally subjected to a reduced normal current intensity. This reduced normal current intensity usually reflects a maximum service life of the emergency power source. I.e., the reduced normal current intensity is calculated and set such that the emergency power source reaches a maximum service life.

In this context, the control unit ensures that the charging current intensity and/or charging voltage of the emergency power source are each monitored; normally, the charging current intensity and/or the charging voltage are controlled using the control unit. Also, different time-dependent current/voltage profiles can be stored in the control unit. The current/voltage profiles are optionally used depending on the emergency power source, electromotive opening drive, and main energy source used. I.e., depending on how high, for example, the electrical energy requirement of the electromotive opening drive is in the specific individual case, the initial current intensity and its time profile are predefined in order to achieve the necessary minimum charge state. Of course, in this context, the emergency power source used in each case also plays a role in whether, for example, a rechargeable battery, a supercapacitor or several supercapacitors are used and how they are designed, i.e., how quickly they can be charged, for example.

Finally, the invention recommends using one or more supercapacitors as an emergency power source. The respective supercapacitor or the several supercapacitors can be accommodated on an obligatory circuit board inside a lock housing. Of course, external attachment outside the lock housing is also possible and is encompassed by the invention.

As a result, a door lock and in particular a motor vehicle door lock is provided which ensures that the emergency power source is generally charged to such an extent immediately after starting the associated motor vehicle or has the minimum charge state so that an emergency opening of the locking mechanism is possible even in the event of an accident happening immediately after the start of the trip. As a result, safety is increased enormously, and it is possible in principle to dispense with mechanical redundancies. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
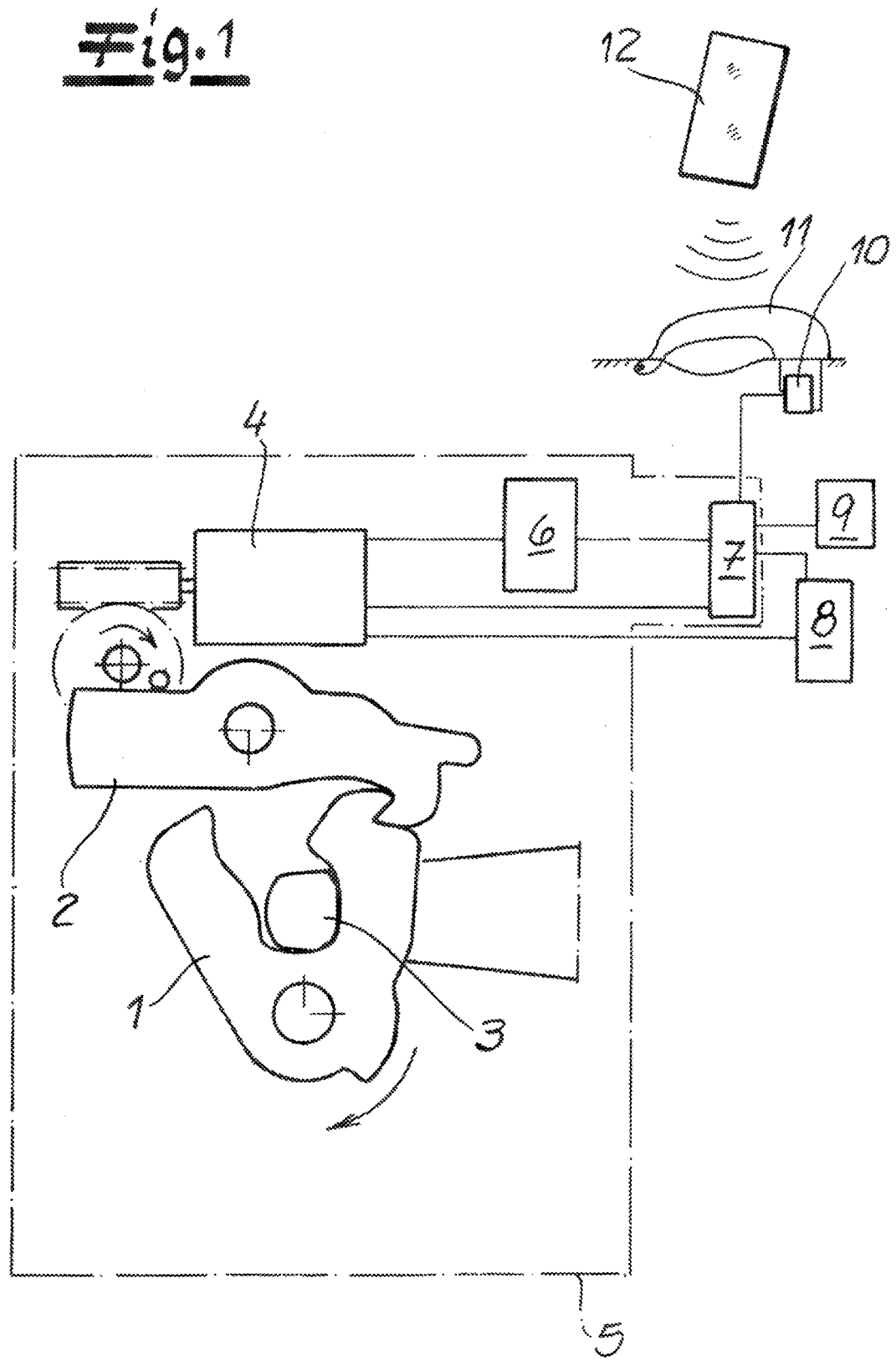
FIG. 1 shows an overview of the door lock according to the invention in the form of a motor vehicle door lock.

The figures show a door lock which, within the scope of the exemplary case, is a motor vehicle door lock. In its basic structure, said latch has a locking mechanism 1, 2 consisting essentially of a rotary latch 1 and a pawl 2. The locking mechanism 1, 2 interacts with an indicated locking pin or lock holder 3 which is provided on the motor vehicle side, whereas the locking mechanism 1, 2 is generally arranged inside a motor vehicle door (not shown in detail).

The locking mechanism 1, 2 together with an electromotive opening drive 4 is arranged inside a housing 5. In addition, an emergency power source 6 and a control unit 7 can also be seen inside the housing 5. The emergency power source 6 can be used to supply the opening drive 4 with current during emergency opening of the locking mechanism 1, 2. Generally and in normal operation, however, the opening drive 4 is supplied with current using a main energy source 8.

It can be seen that both the emergency power source 6 and the main energy source 8 are each connected to the control unit 7, on the one hand, and to the electromotive opening drive 4, on the other. The same applies to the control unit 7, which thus ensures controlling of the electromotive opening drive 4 both during opening in normal operation or normal opening and during emergency opening.

The main energy source 8 is arranged outside the lock housing 5 and is located in a motor vehicle body (not shown in detail) to which the motor vehicle door (also not shown explicitly) with the motor vehicle lock located inside is attached. In principle, the motor vehicle or motor vehicle body also has a starting device 9 which is also connected to the control unit 7.

This also applies to a sensor 10, which is a switch 10 that detects actuations of an outside door handle 11. When the outside door handle 11 is operated for opening the locking mechanism 1, 2, the sensor or switch 10 outputs a signal to the control unit 7. However, this requires that the control unit 7 first ensures unlocking of the motor vehicle door lock.

According to the exemplary embodiment, said unlocking is initiated using an unlocking signal which is wirelessly received by the control unit 7, as indicated in FIG. 1. In fact, the unlocking signal according to the exemplary embodiment comes from a transceiver unit 12, which can be a remote control key, a remote control, etc. In general, a magnetic card or the like can also be used at this point, which is queried by a question/response dialog with regard to the authorization of a user wishing to enter the vehicle, when the latter approaches the vehicle. Either way, in the exemplary embodiment an approach of the authorized user wishing to enter the vehicle results in that the unlocking signal is transmitted wirelessly or also in a wired manner to the control unit 7, as shown. The unlocking signal causes the switch 10 to be "activated" and to be able to be queried in order to open the locking mechanism 1, 2.

According to the invention, the design is now such that the emergency power source 6 is charged as soon as the control unit 7 receives the unlocking signal for the locking mechanism 1, 2. According to the exemplary embodiment, the unlocking signal originates, in a non-limiting way, from the transceiver unit 12. Alternatively or additionally, however, the unlocking signal for the control unit 7 can also be provided by a control device and, in particular, by a door control device, which is not shown individually and in detail.

After receiving the unlocking signal, the control unit 7 bridges the starting device 9. In this way, the main energy source 8 is connected directly to the emergency power source 6. I.e., the unlocking signal and it being received by the control unit 7 directly results in the main energy source 8 being electrically connected to the emergency power source 6 and directly charging the emergency power source 6. In contrast, in the prior art such a charging process takes place only when the starting device 9 is operated. According to the invention, this is not necessary because the control unit 7 bridges the starting device 9 after receiving the unlocking signal and connects the main energy source 8 directly with the emergency power source 6.

Figure 2:
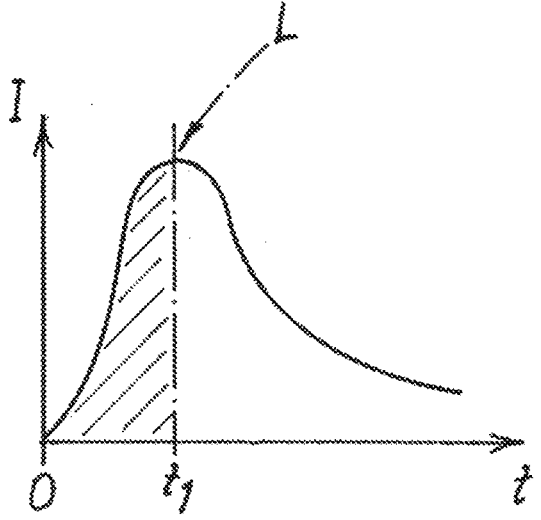
FIG. 2 schematically shows a time-dependent signal of the charging current for the emergency power source.

It can now be seen from FIG. 2 how the emergency power source 6 is charged over time. In fact, FIG. 2 shows a current or charging current I compared to the time t. It can be seen that the emergency power source 6 is supplied with an increased initial current intensity at the beginning of the charging process.

The increased initial current intensity and the consequentially increased charging current I for supplying the emergency power source 6 is maintained until a minimum charge state L of the emergency power source 6 indicated in FIG. 2 has been reached. This minimum charge state L of the emergency power source 6 corresponds to the emergency power source 6 being charged to such an extent that, with its aid, the electromotive opening drive 4 is able to open the locking mechanism 1, 2 at least once during emergency opening of the locking mechanism 1, 2.

According to the representation in FIG. 2, the minimum charge state L of the emergency power source 6 does in fact correspond to the integral of the time-dependent current intensity or charge current intensity I (t) reaching a specific value, which is dependent on the electromotive opening drive 4, for one-time opening. As soon as the emergency power source 6 has reached the minimum charge state, $$L = \int_0^n I(t)dt$$

the emergency power source 6 is supplied with a, in contrast, reduced normal current intensity after reaching the minimum charge state L, as can be seen from the time-dependent profile of the current intensity I following the minimum charge state L shown hatched in FIG. 2.

The reduced normal current intensity observed subsequent to the minimum charge state L reflects a maximum service life of the emergency power source 6. In any case, the design is such that the control unit 7 monitors the charging current intensity I according to the representation in FIG. 2 and/or the charging voltage at the emergency power source 6. According to the invention, monitoring of the charging current intensity I or the charging voltage by the control unit 7 means that the charging current intensity I and/or the charging voltage for the emergency power source 6 are specified such as to be controlled and/or regulated using the control unit 7. Also, the design is such that various time-dependent current profiles, as shown in FIG. 2, are stored in the control unit 7. Differently designed emergency power sources 6, varying electromotive opening drives 4 and different characteristics of the main energy source 8 can be reflected using these current profiles or also corresponding voltage profiles, and the respective current/ voltage profile can be adapted to the specific circumstances.

According to the exemplary embodiment, the emergency power source 6 is one or more supercapacitors which are arranged not only inside the lock housing 5, but also on a circuit board or printed circuit board (not expressly shown). The same applies to the control unit 7.

LIST OF REFERENCE SIGNS

1,2 locking mechanism
1 rotary latch
2 pawl
3 Locking pin or lock holder
4 Opening drive
5 Lock housing
6 Emergency power source
5 7 Control unit
8 Main energy source
9 Starting device
10 Sensor
11 Outside door handle
12 Transceiver device
t Time
I Charging current
L Minimum charge state
The invention claimed is:

1. A door lock for a motor vehicle, the door lock comprising:
  a locking mechanism comprising a rotary latch and a pawl,
  an electromotive opening drive for operating the locking mechanism,
  at least one emergency power source for supplying current to the opening drive during an emergency opening of the locking mechanism, and
  a control unit that is operatively connected to the at least one emergency power source and a main energy source, and the control unit is configured to control charging the emergency power source using the main energy source,
  wherein the emergency power source is charged as soon as the control unit receives an unlocking signal for the locking mechanism.

2. The door lock according to claim 1, wherein the unlocking signal is transmitted to the control unit in a wireless manner.

3. The door lock according to claim 1, further comprising a starting device, wherein the control unit bridges the starting device after receiving the unlocking signal and connects the main energy source directly with the emergency power source.

4. The door lock according to claim 1, wherein the control unit is configured to charge the emergency power source with either an increased initial current density or a reduced normal current density that is less than the increased initial current density, and
  the control unit is configured to charge the emergency power source with the increased initial current intensity at a beginning of the charging process.

5. The door lock according to claim 4, wherein the increased initial current intensity is maintained until a minimum charge state of the emergency power source has been reached.

6. The door lock according to claim 5, wherein the control unit is configured to charge the emergency power source with the reduced normal current intensity after reaching the minimum charge state.

7. The door lock according to claim 4, wherein the reduced normal current intensity is based on a maximum service life of the emergency power source.

8. The door lock according to claim 1, wherein the control unit regulates charging current intensity and/or charging voltage of the emergency power source.

9. The door lock according to claim 1, wherein the control unit is configured to store a plurality of time-dependent current/voltage profiles associated with the emergency power source, electromotive opening drive and main energy source being used.

10. The door lock according to claim 1, wherein the emergency power source includes one or more supercapacitors.

11. The door lock according to claim 10, wherein locking mechanism includes a lock housing that houses the rotary latch and the pawl, and the one or more supercapacitors are provided on a circuit board located inside the lock housing.

12. The door lock according to claim 11, wherein the control unit is located inside the lock housing.

13. The door lock according to claim 1, wherein the unlocking signal is transmitted to the control unit in a wired manner.

14. The door lock according to claim 1, wherein the control unit is configured to charge the emergency power source prior to starting the motor vehicle.

15. The door lock according to claim 1, further comprising a sensor that provides the unlocking signal to the control unit.

16. The door lock according to claim 15, wherein the sensor is located on an outside door handle of the motor vehicle and detects actuation of the outside door handle to provide the unlocking signal to the control unit.

* * * * *